July 4, 1961

A. H. BRANDON ET AL 2,990,621

CASING TESTING ATTACHMENT

Filed Dec. 15, 1958

INVENTOR.
ARTHUR H. BRANDON,
BY JENTRY J. RICHART,

ATTORNEY.

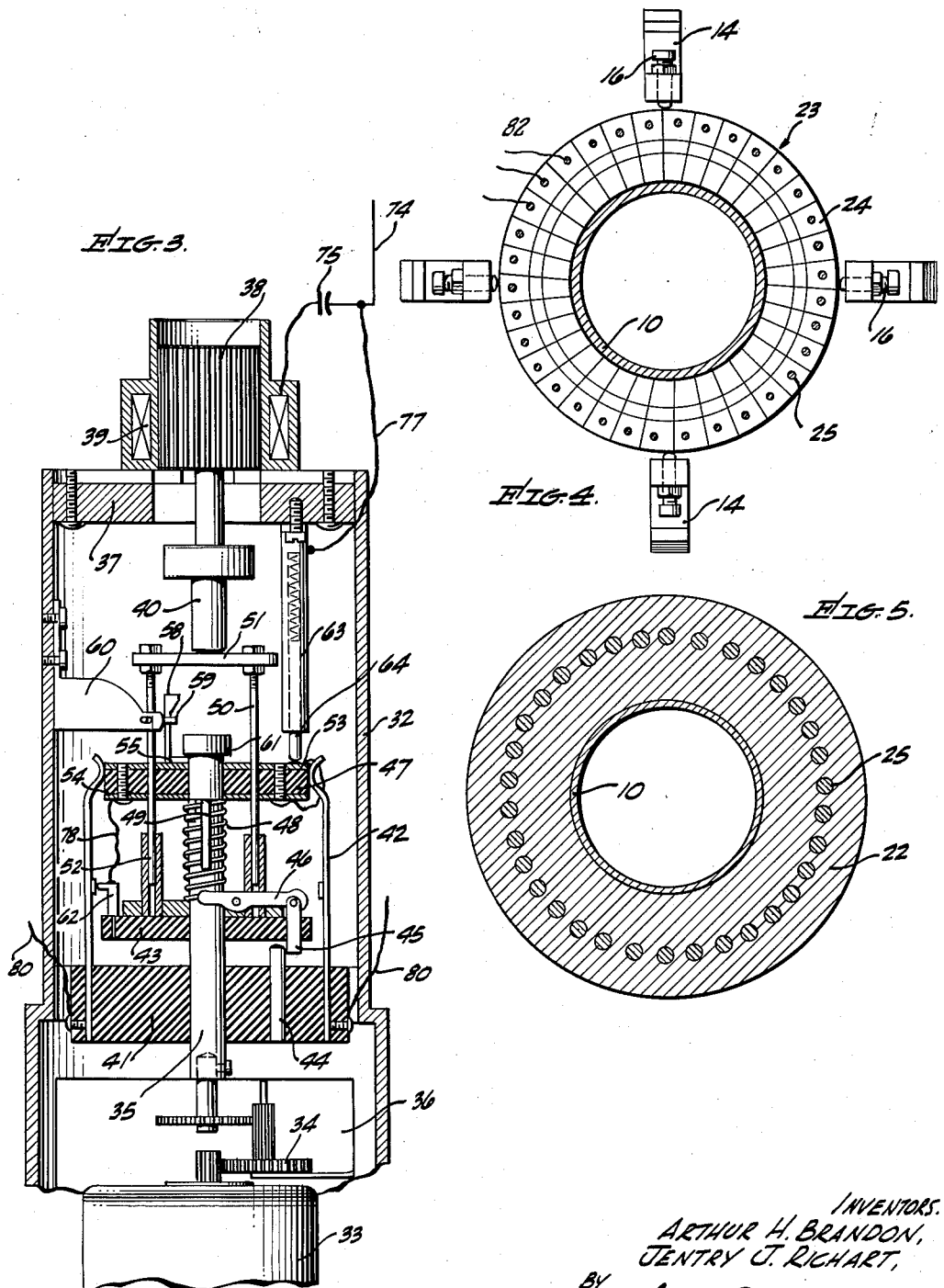

July 4, 1961  A. H. BRANDON ET AL  2,990,621
CASING TESTING ATTACHMENT
Filed Dec. 15, 1958  3 Sheets-Sheet 3
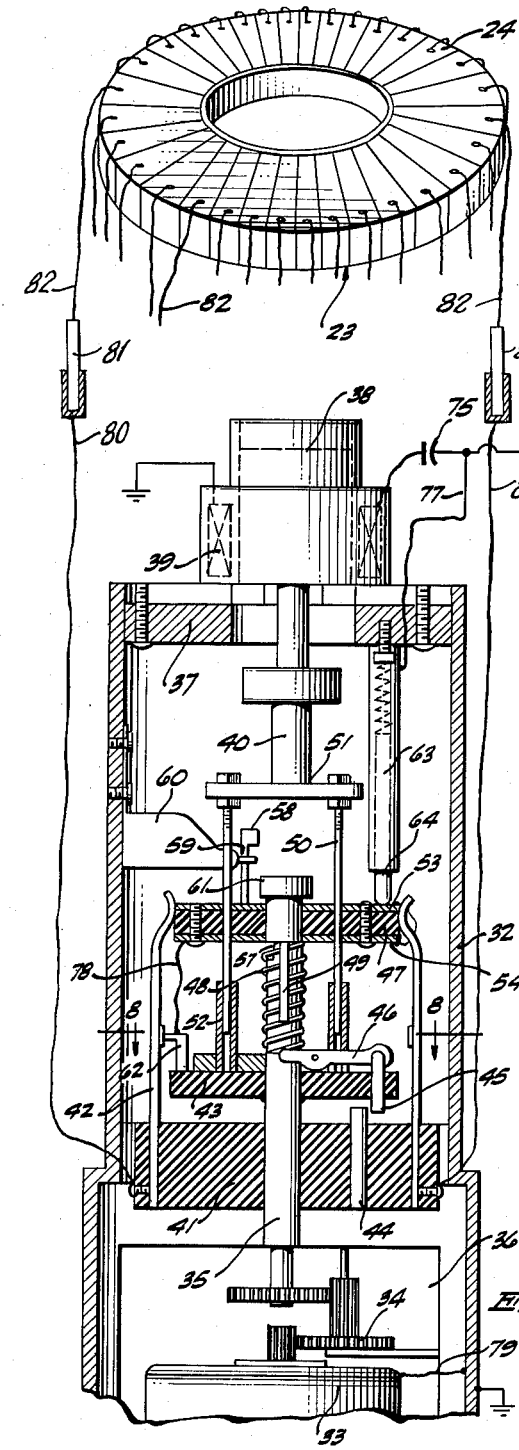
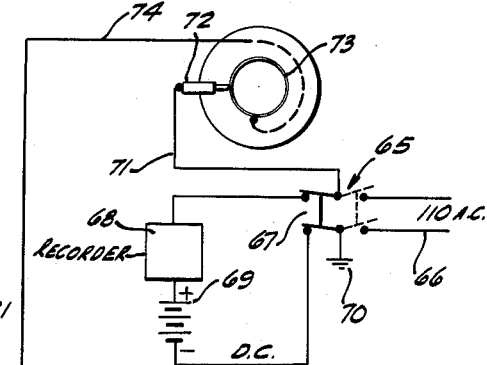
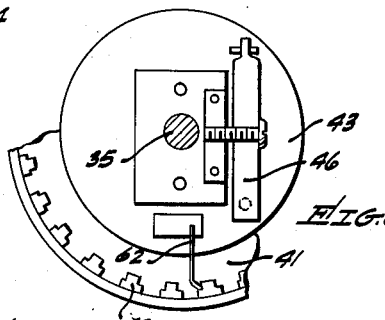
INVENTORS.
ARTHUR H. BRANDON,
JENTRY J. RICHART,
BY
ATTORNEY.

United States Patent Office 2,990,621
Patented July 4, 1961

2,990,621
CASING TESTING ATTACHMENT

Arthur H. Brandon, 1450 Ramillo Ave., Long Beach, Calif., and Jentry J. Richart, 9756 Sante Fe Springs Road, Whittier, Calif., assignors to Harry Whittaker, Whittier, Calif.

Filed Dec. 15, 1958, Ser. No. 780,337
12 Claims. (Cl. 33—178)

This invention relates to a casing or tubing testing attachment whereby the exact position of a worn spot in the casing or tubing can be determined, both as to its depth below the surface and its angular position.

This invention is an improvement on the prior patents issued to A. H. Brandon, No. 2,322,343, June 22, 1943, and No. 2,766,533, issued October 16, 1956.

A prime object of our invention is to provide a testing attachment to a casing or tubing tester which may be introduced into a pipe or tubing, and which will indicate electrically at a remote point not only the degree to which the tube may have become internally worn, but also the angular position of that worn area within the pipe.

Another object of this invention is to provide a testing attachment of the character stated wherein a plurality of radially expansible fingers are provided, the fingers being engageable with the interior of the tubing and which are urged outwardly and to provide a novel means for indicating which of the fingers have been moved outwardly into a worn area of the pipe, and particularly the angular position of that particular finger or fingers which are projected outwardly to an abnormal extent.

Still another object of our invention is to provide a novel testing attachment of the character stated wherein a rotating mechanism is actuated from a remote point at the surface, this rotating mechanism causing a contact to sweep certain spring fingers which indicate the angular position of the pipe engaging expansible finger which has been moved to the deepest point in the wall of the pipe.

Still another object is to provide a novel testing attachment of the character stated in which the rotating mechanism of the attachment may be electrically tripped from the ground surface, and while the tool is at any depth within the well.

Other objects, advantages and features of invention may appear from the accompanying drawings, the subjoined detailed description and the appended claims.

In the drawing

FIGURE 3 is a fragmentary vertical sectional view of our casing testing attachment.

FIGURE 4 is a sectional view taken on line 4—4 of FIG. 1.

FIGURE 5 is a sectional view taken on line 5—5 of FIG. 1.

FIGURE 6 is a diagrammatic view of our casing testing attachment and illustrating the various electrical elements.

FIGURE 7 is a fragmentary perspective of the control disc for the spring fingers and the mounting therefor.

FIGURE 8 is a fragmentary sectional view taken on line 8—8 of FIG. 6.

Figure 1:
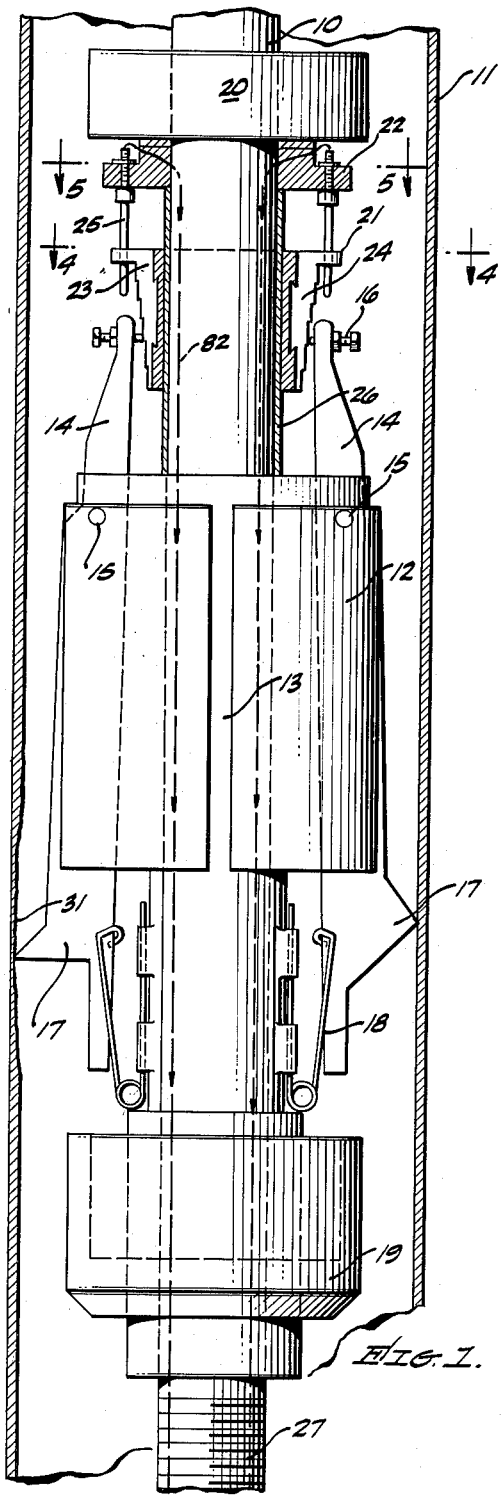
FIGURE 1 is a vertical sectional view of a portion of our casing testing device and illustrating the same within a tubing or casing which is to be tested.

Referring more particularly to the drawing, and especially FIGURE 1 which is an illustration of a tubing tester as shown in the patent issued to A. H. Brandon, No. 2,766,533, October 16, 1956, and comprises a hollow central mandrel 10 upon which centering devices, not shown, are mounted. These centering devices are usual and well known in the art and one type thereof are illustrated in the above mentioned patent. These centering devices hold the mandrel 10 centrally of the tubing or casing 11 which is to be tested. Approximately midway on the mandrel 10 we provide a collar 12 which is fixedly mounted on the mandrel in a suitable manner. The collar has a plurality of radial slots 13 formed on the exterior thereof, and these slots extend vertically in the collar. A radially swingable finger 14 is pivotally mounted in each of the radial slots and these fingers are each mounted on a pivot pin 15 substantially as shown. A set screw 16 extends through the upper end of each of the fingers 14 and these set screws are adapted to engage the various segments of a commutator, which will be subsequently described. Adjacent the lower end of each of the fingers 14 an outwardly projecting tip 17 is provided, and these tips are each arranged in a different horizontal plane so that different vertical areas within the pipe 11 are thus engaged whereby a wider area of contact may be provided at each position which the tool may assume within the pipe. The fingers 14 are each engaged by a spring 18 which urges each of the fingers outwardly into engagement with the inner wall of the pipe 11. A collar 19, on the lower end of the mandrel 10, prevents downward movement of the entire assembly on the mandrel, and also permits the easy assembly of the various parts on the mandrel. A second collar 20, adjacent the upper end of the mandrel 10, is also removably mounted thereon so that the parts of the tool can be thus assembled between the two collars 19 and 20.

A commutator assembly 21 is mounted between the collars 20 and 12 and consists of an upper ring 22 which surrounds the mandrel 10. An elongated commutator 23 is formed with a plurality of radial contact segments 24 and each of these segments is connected to the ring 22 by means of a vertical pin 25. These pins 25 serve as electrical connectors projecting from each of the commutator segments 24 and extend through the ring 22 as shown. The outer surface of each of the segments 24 is stepped to provide successively increasing diameters for the commutator 23, which permits the commutator 23 to be adjusted vertically on its inner sleeve 26 to provide for different inside diameters of various pipes 11. Also adjustment of the set screws 16 will permit compensation for inside diameter of various pipes in which the tool may be run. As thus far described the tool is similar to the tubing tester disclosed in Patent No. 2,766,533.

The lower end of the mandrel 10 is threaded as shown at 27, and our testing attachment 28 is threaded onto the mandrel by means of the threaded coupling 29 on the upper end of the attachment. The coupling 29 is mounted on a tubular case 30 in which our mechanism for determining the angular position of the worn place within the pipe 11 is mounted. When the tip 17 on one of the fingers 14 extends into a worn area 31, as shown in FIG. 1, the set screw 16 of that finger will engage one of the segments 24 of the commutator 23; thus forming an electrical contact in the same manner as described in Patent No. 2,766,533, and other similar structures. That is, the set screw 16 engaging one of the segments 24 of the commutator 23 will ground that particular segment, since the other end of the finger 14 is engaging the pipe or tubing 11 which is grounded.

Figure 2:
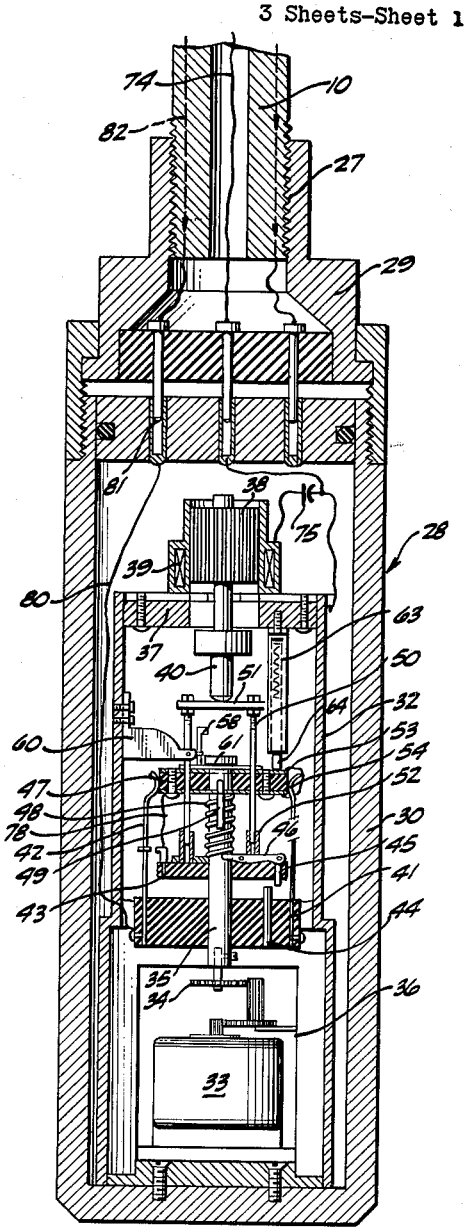
FIGURE 2 is a longitudinal sectional view of our casing testing attachment.

A tubular sleeve 32 is fixedly mounted within the case 30 and this sleeve houses the mechanism for determining an angular position of the worn place within the pipe or tubing 11. The angular position determining mechanism consists essentially of a means of successively electrically contacting a number of fingers which are connected in series with each segment 24 of the commutator 23. The sweep contact for the various fingers and the driving mechanism therefor consists of the following structure:

A spring clock mechanism 33 drives suitable gearing 34 connected thereto, and this gearing extends to and drives a vertical shaft 35 which rises from the housing 36 of the clock mechanism. A wall 37 incloses the upper end of the sleeve 32 and this wall supports a solenoid 38. The windings of the solenoid 38 are indicated at 39 and the electrical circuit in which this coil is mounted will be subsequently described. The solenoid 38 includes a core 40 which engages the tripping mechanism as follows:

A disc 41, formed of insulating material, is fixedly mounted in the sleeve 32 immediately above the gear drive 34. The shaft 35 is journaled in this disc. A plurality of spring fingers 42 are mounted adjacent the periphery of the disc 41 and these fingers project upwardly from the disc. There is one finger 42 for each of the commutator segments 24 and each finger 42 is electrically connected in series with one of the commutator segments 24, as will be subsequently described. A timing disc 43 is fixedly attached to the shaft 35 immediately above the disc 41. This timing disc is preferably formed of an insulating material and is spaced slightly above the disc 41 to accommodatae the release mechanism. This release mechanism includes a stop pin 44 which is fixed in the disc 41 and projects slightly above this disc. A pin 45 is slidably mounted in the timing disc 43 and is moved vertically into or out of alignment with the stop pin 44 by means of a lever 46 pivotally mounted on the top of the disc 43. When the swinging end of the lever 46 is engaged it will pull the pin 45 upwardly out of alignment with the stop 44, thus permitting the shaft 35 to be rotated by the spring clock mechanism 33. An actuating plate 47 is slidably mounted on the shaft 35 and normally is positioned adjacent the upper end of this shaft when the mechanism is not operating. A spring 48 surrounds the shaft 35 and engages the plate 47 to normally press this plate upwardly to the position shown in FIG. 2. The plate 47 is slidable on the shaft 35 against the tension of the spring 48 and in the lowermost position of this plate a pin 49 depending therefrom will engage the swinging end of the lever 46 to disengage the trip pin 45. Downward movement of the plate 47 is accomplished by means of the pair of vertical rods 50—50 which extend through the plate and are fixedly attached therein. A bar 51 connects the upper ends of the rods 50 and this connecting plate is engaged by the core 40 of the solenoid so that when the solenoid is actuated the rods 50 and the plate 47 will be pressed downwardly. The lower ends of the rods 50 extend into guide sleeves 52 which sleeves rise from the timing disc 43. The plate 47 consists of upper and lower metal contact rings or plates 53 and 54, which contact rings are separated by an insulated portion of the plate 47.

A latch dog 55 is pivotally mounted on the upper face of the plate 47 and is pressed towards the shaft 35 by means of the spring 56. The shaft is provided with a notch 57 into which the dog 55 is pressed when the plate 47 is pushed downwardly by the solenoid 38. A finger 58 rises from the dog 55, and this finger will engage a pin 59 on a mounting plate 60 when the plate 47 has made one complete revolution to cam the dog 55 out of the slot 57 and permit the plate 47 to rise to its normal position, shown in FIGS. 2, 3 and 6. The plate 60 is attached to the inside of the sleeve 32. A head 61 on the upper end of the shaft 35 will limit the upward movement of the plate 47. After one complete revolution of the plate 47 the finger 58 engages the pin 59 to cam the dog 55 out of the slot 57, thus permitting the plate 47 to spring upwardly under pressure of the spring 48. The dog 55, while engaging in the slot 57, will keep the plate 47 in proper alignment relative to the other parts on the shaft 35, and will also hold this plate in its depressed position until a complete revolution of the shaft has been accomplished, and thereafter the plate 47 can spring upwardly to engage the fingers 42 for electrical contact purposes, as will be further described. When the plate 47 is pushed downwardly the fingers 42 are disengaged therefrom and the electrical contact between this plate and the fingers is broken. The purpose of this construrction is to permit electrical impulses to be transmitted to the surface by engagement of the spring contact 62 on the timing disc 43, when the proper finger 42 is thus engaged and impulses sent to the surface, as will be further described. A contact sleeve 63 extends downwardly from the wall 37 and is provided with a spring pressed contact 64 which engages the top contact plate 53 of the plate 47 whereby an electrical contact is made with this top plate for a purpose to be further described. The upper and lower plates 53 and 54 are electrically connected by means of attaching screws or the like, so that both of these metal plates can conduct current.

The wiring pattern for our testing attachment is as follows: On the surface of the ground a two-pole double throw switch 65 is provided, and this switch is manually actuated. 110-volt A.C., as shown at 66, extends to one of the pairs of poles of the switch. The other poles 67 of the switch 65 are connected to a recorder 68 which records each electrical impulse coming from the testing attachment and also the battery 69. The switch 65 is spring pressed to a position in which the recorder 68 and the battery 69 are normally in the circuit. The 110-volt A.C. side of the circuit must be introduced into the system against this spring pressure. One side of the center contact of the switch 65 is grounded, as shown at 70, and the other side is connected through the lead 71 to a brush 72 which engages the commutator ring 73. A cable 74 extends from the ring 73 down through the pipe or tubing 11 and is connected to the testing apparatus as follows: The cable 74 extends to a condenser 75, which condenser is placed in the line to the coil 39 of the solenoid 38. A shunt lead 77 extends from the cable 74 to the contact sleeve 63, so that finger 64 thus supplies current to the plates 53 and 54. A lead 78 extends from the plate 54 to the contact finger 62 to supply current to this finger. The clock mechanism 33, as well as the shaft 35, and the metallic parts connected to this shaft are all grounded to the sleeve 32 through the wire 79. There are the same number of fingers 42 as there are segments 24 and each finger is connected to a lead 80. The leads 80 are each connected to a switch plug 81 at the upper end of the testing attachment 28, and another lead 82 extends from each of the plugs to a segment 24 of the commutator 23, these latter leads all extending through the mandrel 10. At their upper ends the leads 82 are each attached to a pin 25 and these pins each extend into one of the commutator segments 24, as previously described. Thus it will be evident that each segment 24 of the commutator 23 is connected in series with one finger 42. If one of the segments 24 is engaged by a set screw 16 in one of the fingers 14 that segment will be grounded to the pipe or tubing 11 through the finger. Also the particular grounded segment of the commutator is connected to one of the fingers 42 through the leads 80 and 82. Thus when the contact finger 62 sweeps the fingers 42 and engages the finger which is grounded, then a current will pass from the contact 62 to the finger 42, thence to the segment 24 and is there grounded, and current then flows through the cable 74, the brush 72, the lead 71 and the switch 65 to the recorder 68 which records this contact. If more than one commutator segment 24 is grounded by a finger 14, then the additional grounded segments will be indicated and recorded as described above.

In operation

Our casing testing attachment is first lowered into the pipe or tubing 11 and is held in a central position by means of centralizers, which are usual and well known in the art. (One type being shown in Patent No. 2,766,533.) The tool may also be oriented as it is lowered into the pipe or tubing so that its oriented position may be known to the operator at the surface. As the tool is lowered into the pipe or tubing 11 a particular area of the pipe or tubing is investigated as follows: The operator first throws the switch 65 to the 110-volt A.C. side. A 110-volt current is then passed downwardly through the cable 74, passes through the condenser 75 and activates the coil 39 of the solenoid 38. The core 40 of this solenoid then moves downwardly and pushes the bar 51 on the rods 50 and also the plate 47 downwardly against the pressure of the spring 48. The plate 47 is now below the engaging ends of the fingers 42 so that current cannot flow through these fingers and to the commutator 23 to injure these parts. It is to be remembered that at this time 110-volts are applied to the cable 74. This downward movement of the plate 47 also carries the finger 58 slightly below the pin 59, permitting the spring 56 to press the dog 55 into the notch 57. This holds the plate 47 in its lowered or depressed position. During the downward movement of the plate 47 the pin 49 has engaged the lever 46 and the pin 45 disengages the stop 44. The spring motor 33 is constantly wound, and as soon as the timing disc 43 is thus released the shaft 35 starts to rotate slowly. During this very short interval of time required to activate the solenoid 38 the operator instantly releases the switch 65. The switch then by spring action engages the contacts 67 and throws the battery 69 into the circuit, whereupon a low voltage current flows through the cable 74. The condenser 75 blocks off this low voltage current from the solenoid 38 so that the solenoid is not activated by the low voltage current at all. The low voltage current then flows through the lead 77 to the contact 64 and current flows to the plates 53 and 54, and these plates are not engaged by the upper ends of the fingers 42. The finger 58 has also passed the cam pin 59 so that the plates 43 and 47 are free to rotate through one complete revolution. The contact finger 62 now sweeps each of the fingers 42 and if any commutator segment 24 is grounded by one of the fingers 14 a current will then flow through the cable 74, the lead 77, contact 64, then to the contact finger 62, the leads 80 and 82 and thence to ground. This activates the recorder 68 and since the testing attachment is oriented the angular position of the worn spot 31 in the pipe 11 is determined. After one complete revolution the finger 58 is engaged by the trip pin 59. This swings the dog 55 out of the notch 57, releasing the plate 47 so that it can spring upwardly to the position shown in FIGS. 3 and 6. The parts are now properly oriented so that the operator can again operate the switch 65 to activate the solenoid 38 as previously described.

It is to be understood that the tool is first lowered to bottom and is then moved slowly upwardly for the purpose of testing the pipe, as stated above. The various fingers 14 which engage the pipe have been released by means not shown for outward movement when the tool reaches bottom and these fingers can now spring outwardly to engage the pipe. At least one of the fingers 14 has a square shoulder thereon which enters a space in the first collar above bottom, and since the depth of the well is known by reason of the stands of pipe which are in it the position of the casing testing attachment is, therefore, known. Also its depth below the surface is thus determined. Subsequent testing locations are thus determined by the operator since the amount of cable which is reeled on to a drum at the surface can easily determine the depth of the tool in the well.

Having described my invention, we claim:

1. A casing testing attachment for locating surface variations in a well pipe, comprising a plurality of circumferentially spaced feeler fingers, means pivotally supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a plurality of circumferentially arranged contact fingers, an electrical contact adapted to successively engage each of the contact fingers, said contact fingers and segments being electrically connected, drive means for the electrical contact to sweep said contact fingers, and a recorder means electrically associated with said commutator and contact fingers for recording such lateral displacement of the feeler fingers in each lateral plane traversed by said attachment.

2. A casing testing attachment for locating surface variations in a well pipe, comprising a plurality of circumferentially spaced feeler fingers, means pivotally supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a plurality of circumferentially arranged contact fingers, an electrical contact adapted to successively engage each of the contact fingers, said contact fingers and segments being electrically connected, drive means for the electrical contact to sweep said contact fingers, and a recorder means electrically associated with said commutator and contact fingers for recording such lateral displacement of the feeler fingers in each lateral plane traversed by said attachment, a tip on each of the feeler fingers, the tips being spaced vertically on the various fingers to engage the pipe in different vertical planes.

3. A casing testing attachment for locating surface variations in a well pipe, comprising a plurality of circumferentially spaced feeler fingers, means pivotally supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a plurality of circumferentially arranged contact fingers, an electrical contact adapted to engage each of the contact fingers, the contact fingers and segmens being electrically connected in pairs, spring actuated drive means extending to the electrical contact to rotate said contact over the contact fingers, and a recorder means electrically associated with said commutator and contact fingers for recording such lateral displacement of the feeler fingers in each lateral plane traversed by said attachment.

4. A casing testing attachment for locating surface variations in a well pipe, comprising a plurality of circumferentially spaced feeler fingers, means pivotally supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a plurality of circumferentially arranged contact fingers, an electrical contact adapted to engage each of the contact fingers, the contact fingers and segments being electrically connected in pairs, spring actuated drive means extending to the electrical contact to rotate said contact over the contact fingers, stop means on said drive means, a solenoid adjacent the drive means and engageable with the stop means to release said stop means, and a remote switch manually operable to actuate said solenoid, and a recorder means electrically associated with said commutator and contact fingers for recording such lateral displacement of the feeler fingers in each lateral plane traversed by said attachment.

5. A casing testing attachment for locating surface variations in a well pipe, comprising a plurality of circumferentially spaced feeler fingers, means pivotally supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a plurality of circumferentially arranged contact fingers, an electrical contact adapted to engage each of the contact fingers, the contact fingers and segments being electrically connected in pairs, spring actuated drive means extending to the electrical contact to rotate said contact over the contact fingers, stop means on said drive means, a solenoid adjacent the drive means and engageable with the stop means to release said stop means, and a remote switch manually operable to actuate said solenoid, and a recorder means electrically associated with said commutator and contact fingers for recording such lateral displacement of the feeler fingers in each lateral plane traversed by said attachment, a tip on each feeler finger, the tips being spaced vertically on the various fingers to engage the pipe in different vertical planes.

6. A casing testing attachment for locating surface variations in a well pipe, comprising a plurality of circumferentially spaced feeler fingers, means supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a sleeve, means mounting the sleeve below said feeler fingers, a plurality of circumferentially arranged contact fingers mounted in said sleeve, an electrical contact adapted to engage each of the contact fingers, a shaft rotatably mounted in the sleeve and positioned adjacent the contact fingers, a disc on the shaft, said electrical contact being mounted on the disc for successive engagement with the contact fingers, spring actuated drive means engaging said shaft to rotate the same, each of the contact fingers and a segment of the commutator being electrically connected, trip means to release said spring actuated drive means, a remote switch, said remote switch being electrically connected to said trip means.

7. A casing testing attachment for locating surface variations in a well pipe, comprising a plurality of circumferentially spaced feeler fingers, means supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a sleeve, means mounting the sleeve below said feeler fingers, a plurality of circumferentially arranged contact fingers mounted in said sleeve, an electrical contact adapted to engage each of the contact fingers, a shaft rotatably mounted in the sleeve and positioned adjacent the cotnact fingers, a disc on the shaft, said electrical contact being mounted on the disc for successive engagement with the contact fingers, spring actuated drive means engaging said shaft to rotate the same, each of the contact fingers and a segment of the commutator being electrically connected, trip means to release said spring actuated drive means, a remote switch, said remote switch being electrically connected to said trip means, and trip actuating means consisting of a solenoid mounted on the sleeve, and means extending from the solenoid to the trip means.

8. A casing testing attachment for locating surface variations in a well pipe, comprising a plurality of circumferentially spaced feeler fingers, means supporting said fingers for lateral displacement of said fingers as they contact the surface variations on the inside surface of the pipe, means for moving said device longitudinally in the well pipe, a commutator means engageable by one end of each of said fingers, a plurality of segments on the commutator means, a sleeve, means mounting the sleeve below said feeler fingers, a plurality of circumferentially arranged contact fingers mounted in said sleeve, an electrical contact adapted to engage each of the contact fingers, a shaft rotatably mounted in the sleeve and positioned adjacent the contact fingers, a disc on the shaft, said electrical contact being mounted on the disc for successive engagement with the contact fingers, spring actuated drive means engaging said shaft to rotate the same, stop means on said disc arranged to stop the disc after each complete revolution, a solenoid in the sleeve, means extending from the solenoid to the stop means to disengage said stop means and permit rotation of the disc, a remote switch, and electrical leads extending from the switch to the solenoid.

9. A casing testing attachment for well pipe comprising a plurality of fingers, means pivotally mounting the fingers for independent outward swinging movement, spring means urging each finger outwardly independent of the others, a commutator engageable by each of the fingers on outward swinging movement of the fingers, a plurality of segments on the commutator, a plurality of circumferentially arranged contact fingers, each of the contact fingers and a segment being electrically connected, an electrical contact adapted to engage each of the contact fingers in sequence, said electrical contact being rotatably mounted for movement over the contact fingers, spring drive means extending to the electrical contact to continuously urge rotation of the electrical contact, and stop means engageable with said spring drive means to permit only one complete revolution of said spring drive means.

10. A casing testing attachment for well pipe comprising a plurality of fingers, means pivotally mounting the fingers for independent outward swinging movement, spring means urging each finger outwardly independent of the others, a commutator engageable by each of the fingers on outward swinging movement of the fingers, a plurality of segments on the commutator, a plurality of circumferentially arranged contact fingers, each of the contact fingers and a segment being electrically connected, an electrical contact adapted to engage each of the contact fingers in sequence, said electrical contact being rotatably mounted for movement over the contact fingers, spring drive means extending to the electrical contact to continuously urge rotation of the electrical contact, and stop means engageable with said spring drive means to permit only one complete revolution of said spring drive means, an electrical solenoid, means extending from the solenoid to said stop means to release the same on actuation of the solenoid, a remote switch, and electrical leads extending from the switch to the solenoid for manual control of the solenoid.

11. A casing testing attachment for well pipe comprising a plurality of feeler fingers, means pivotally mounting the feeler fingers for independent outward swinging movement, spring means urging each feeler finger outwardly independent of the others, a commutator engageable by each of the feeler fingers on outward swinging movement of the feeler fingers, a plurality of segments on the commutator, a plurality of circumferentially arranged contact fingers, each of the contact fingers and a segment being electrically connected, an electrical contact adapted to engage each of the contact fingers in sequence, said electrical contact being rotatably mounted for movement over the contact fingers, spring drive means extending to the electrical contact to continuously urge rotation of the electrical contact, and stop means engageable with said spring drive means to permit only one complete revolution of said spring drive means, a tip on each feeler finger, the tips being spaced vertically on the various feeler fingers to engage the pipe in different vertical planes.

12. A casing testing attachment for well pipe comprising a plurality of feeler fingers, means pivotally mounting the feeler fingers for independent outward swinging movement, spring means urging each feeler finger outwardly independent of the others, a commutator engageable by each of the feeler fingers on outward swinging movement of the feeler fingers, a plurality of segments on the commutator, a plurality of circumferentially arranged contact fingers, each of the contact fingers and a segment being electrically connected, an electrical contact adapted to engage each of the contact fingers in sequence, said electrical contact being rotatably mounted for movement over the contact fingers, spring drive means extending to the electrical contact to continuously urge rotation of the electrical contact, and stop means engageable with said spring drive means to permit only one complete revolution of said spring drive means, an electrical solenoid, means extending from the solenoid to said stop means to release the same on actuation of the solenoid, a remote switch, and electrical leads extending from the switch to the solenoid for manual control of the solenoid, a tip on each feeler finger, the tips being spaced vertically on the various feeler fingers to engage the pipe in different vertical planes.

References Cited in the file of this patent

UNITED STATES PATENTS

| | | |
|---|---|---|
| 2,150,070 | Kregecz | Mar. 7, 1939 |
| 2,322,343 | Brandon | June 22, 1943 |
| 2,766,533 | Brandon | Oct. 16, 1956 |
| 2,879,604 | Chaney et al. | Mar. 31, 1959 |